US011236257B2

(12) United States Patent
Matsuda et al.

(10) Patent No.: US 11,236,257 B2
(45) Date of Patent: Feb. 1, 2022

(54) MOISTURE-CURABLE HOT MELT ADHESIVE

(71) Applicant: Henkel AG & Co. KGaA, Duesseldorf (DE)

(72) Inventors: Kenji Matsuda, Osaka (JP); Ai Takamori, Osaka (JP); Tsuyoshi Tamogami, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/013,198

(22) Filed: Jun. 20, 2018

(65) Prior Publication Data

US 2018/0298254 A1 Oct. 18, 2018

Related U.S. Application Data

(63) Continuation of application No. PCT/JP2016/087917, filed on Dec. 20, 2016.

(30) Foreign Application Priority Data

Dec. 25, 2015 (JP) .............................. JP2015-254365

(51) Int. Cl.
| C09J 175/08 | (2006.01) |
| C09J 125/16 | (2006.01) |
| C08G 18/76 | (2006.01) |
| C08G 18/40 | (2006.01) |
| C08G 18/42 | (2006.01) |
| C08G 18/48 | (2006.01) |
| C09J 173/00 | (2006.01) |
| C08L 29/04 | (2006.01) |
| C08L 23/02 | (2006.01) |
| C09J 175/04 | (2006.01) |
| C08L 23/04 | (2006.01) |
| C08L 25/16 | (2006.01) |
| B32B 27/40 | (2006.01) |
| B32B 27/36 | (2006.01) |
| C08G 65/26 | (2006.01) |
| C08L 75/04 | (2006.01) |
| B32B 7/12 | (2006.01) |
| B32B 27/06 | (2006.01) |
| B32B 21/02 | (2006.01) |

(Continued)

(52) U.S. Cl.
CPC .............. C09J 175/08 (2013.01); B32B 7/12 (2013.01); B32B 13/08 (2013.01); B32B 13/10 (2013.01); B32B 13/12 (2013.01); B32B 21/02 (2013.01); B32B 21/04 (2013.01); B32B 21/06 (2013.01); B32B 21/08 (2013.01); B32B 21/13 (2013.01); B32B 21/14 (2013.01); B32B 27/06 (2013.01); B32B 27/08 (2013.01); B32B 27/10 (2013.01); B32B 27/302 (2013.01); B32B 27/304 (2013.01); B32B 27/32 (2013.01);

B32B 27/36 (2013.01); B32B 27/365 (2013.01); B32B 27/40 (2013.01); B32B 29/002 (2013.01); C08G 18/4018 (2013.01); C08G 18/4202 (2013.01); C08G 18/4213 (2013.01); C08G 18/4854 (2013.01); C08G 18/7671 (2013.01); C08G 65/2615 (2013.01); C08L 23/02 (2013.01); C08L 23/04 (2013.01); C08L 23/10 (2013.01); C08L 25/16 (2013.01); C08L 29/04 (2013.01); C08L 75/04 (2013.01); C09J 125/16 (2013.01); C09J 173/00 (2013.01); C09J 175/04 (2013.01); B32B 2250/02 (2013.01); B32B 2250/24 (2013.01); B32B 2255/08 (2013.01); B32B 2255/10 (2013.01); B32B 2255/12 (2013.01); B32B 2255/26 (2013.01); B32B 2307/402 (2013.01); B32B 2307/41 (2013.01); B32B 2307/412 (2013.01); B32B 2307/548 (2013.01); B32B 2307/58 (2013.01); B32B 2419/00 (2013.01); B32B 2419/04 (2013.01); B32B 2451/00 (2013.01); B32B 2457/00 (2013.01); B32B 2479/00 (2013.01); B32B 2605/00 (2013.01); C08G 2170/20 (2013.01)

(58) Field of Classification Search
CPC ...... C09J 175/04; C09J 123/10; C09J 123/12; C09J 123/14; C09J 123/16; C08L 23/10
See application file for complete search history.

(56) References Cited

U.S. PATENT DOCUMENTS 5,939,499 A 8/1999 Anderson et al.
9,605,187 B2 3/2017 Helmeke et al.
(Continued)

FOREIGN PATENT DOCUMENTS

EP 0232055 A2 8/1987
JP H02305881 A 12/1990
(Continued)

OTHER PUBLICATIONS

Machine Translation of JP 2004010809 A (Year: 2020).*
Machine Translation of JP 2008248152 A (Year: 2020).*
Levamelt Product Range. Alanxeo Performance Elastomers. (Year: 2020).*
Clariant Brochure Licocene. Bonding without Boundaries: Licocene Performance Polymers for Hot Melt Adhesives. (Year: 2017).*
(Continued)

Primary Examiner — Michael M Dollinger
(74) Attorney, Agent, or Firm — James E. Piotrowski

(57) ABSTRACT

The object of the present invention is to provide a moisture-curable hot melt adhesive having high initial adhesive strength, long open time, excellent coating property and reduced stringing property. The present invention relates to a moisture-curable hot melt adhesive comprising (A) a urethane prepolymer having a terminal isocyanate group, (B) a metallocene-based polyolefin having a viscosity of 10,000 mPa·s or less at a temperature of 170° C. and (C) a polyester-polyether copolymer.

13 Claims, No Drawings

(51) Int. Cl.
  *B32B 21/14* (2006.01)
  *B32B 27/32* (2006.01)
  *C08L 23/10* (2006.01)
  *B32B 13/10* (2006.01)
  *B32B 27/08* (2006.01)
  *B32B 13/08* (2006.01)
  *B32B 21/08* (2006.01)
  *B32B 27/30* (2006.01)
  *B32B 29/00* (2006.01)
  *B32B 21/04* (2006.01)
  *B32B 21/13* (2006.01)
  *B32B 13/12* (2006.01)
  *B32B 21/06* (2006.01)
  *B32B 27/10* (2006.01)

(56) References Cited

U.S. PATENT DOCUMENTS

| | | | | |
|---|---|---|---|---|
| 2009/0203847 | A1* | 8/2009 | Ellis | C08L 23/04 525/221 |
| 2009/0237773 | A1* | 9/2009 | Cao | C08G 18/758 359/296 |
| 2012/0288720 | A1* | 11/2012 | Helmeke | C08L 53/02 428/425.1 |
| 2014/0234644 | A1* | 8/2014 | Davis | B32B 7/12 428/486 |

FOREIGN PATENT DOCUMENTS

| | | |
|---|---|---|
| JP | 3022924 B2 | 3/2000 |
| JP | 2004010809 A | 1/2004 |
| JP | 2008248152 A | 10/2008 |
| JP | 2014518916 A | 8/2014 |
| WO | 9115530 A1 | 10/1991 |
| WO | 0181495 A2 | 11/2001 |
| WO | 2012154940 A1 | 11/2012 |

OTHER PUBLICATIONS

Aktenzeichen : 22362 et al.: Endbericht zum DBU-Projekt Einsatz von modifiziertem Holz zur Verbesserung der Eigenschaften von Holzfenstern Projektjahre 2005 BIS 2007 DMDHEU Und Wachsbehandlung, Apr. 1, 2008 (Apr. 1, 2008) pp. 64-65.
Supplementary EP Search Report for EP Patent Application No. 16 87 8683 dated Jun. 17, 2019.
International Search Report for International PCT Patent Application No. PCT/JP2016/087917 dated Mar. 28, 2017.
Common knowledge exhibit 1: Adhesives and Coatings, Gu Jiyou, China Forest Press, pp. 166, May 30, 1990.

* cited by examiner

MOISTURE-CURABLE HOT MELT ADHESIVE

This application claims benefit under Paris Convention of Japanese Patent Application No. 2015-254365 filed on Dec. 25, 2015, incorporated herein by reference in its entirety.

The present invention relates to a moisture-curable hot melt adhesive and a method for producing the same.

BACKGROUND ART

Hot melt adhesives are utilized in various fields such as the field of building interior materials (or the field of building materials) and the field of electronic materials. From the viewpoint of being not easily influenced by an external factor and being easily used for a long period, particularly moisture-curable hot melt adhesives attract attention.

Examples of the moisture-curable hot melt adhesives include an adhesive comprising a urethane prepolymer having an isocyanate group at a terminal. At least one of a base material and an adherend is coated with the moisture-curable hot melt adhesive generally in a heated and melted state, and the moisture-curable hot melt adhesive is cooled and solidified to initially adhere. Then, the isocyanate group is cross-linked by water in the air, and the molecular weight of the urethane prepolymer increases by moisture curing, and the adhesion, the heat resistance and the like are improved.

One of the performances required for a moisture-curable hot melt adhesive is initial adhesive strength. Means for increasing the initial adhesive strength includes a method in which a tackifying resin is mixed in a moisture-curable hot melt adhesive to increase initial wettability on a base material, and a thermoplastic resin is mixed in the moisture-curable hot melt adhesive to improve initial cohesion. But, the tackifying resin and the thermoplastic resin do not always have sufficient compatibility with a urethane prepolymer that is a main component of the moisture-curable hot melt adhesive. Further, there are problems in the aspect of work, for example, it is difficult to work because the time lapse from when the moisture-curable hot melt adhesive is applied until it is cured (open time) is too short, and it is difficult to apply the adhesive because the viscosity of the adhesive is too high.

Patent Literatures 1 and 2 each disclose a moisture-curable hot melt adhesive comprising a urethane prepolymer and a thermoplastic resin. Patent Literature 1 describes a moisture-curable hot melt adhesive obtained by adding a urethane prepolymer to an ethylene vinyl acetate resin (ethylene-acetate copolymer) and a polyester ether thermoplastic resin that are thermoplastic resins (p. 10, Example V). Patent Literature 2 also describes a moisture-curable hot melt adhesive obtained by adding a urethane prepolymer and polymeric MDI to an ethylene vinyl acetate resin and a polyester ether thermoplastic resin (Claim 1, Claim 2, [0024]).

However, a problem of the moisture-curable hot melt adhesives of Patent Literatures 1 and 2 is that the open time is too short. Generally, the short open time of the adhesive leads to early solidification of the adhesive, and therefore the adhesive is not suitable for being directly applied to an adherend having a complicated shape by a worker.

Patent Literature 3 discloses a reactive hot melt adhesive (moisture-curable hot melt adhesive) containing a urethane prepolymer and a metallocene polyolefin ([Claim 1]). Problems of the moisture-curable hot melt adhesive of Patent Literature 3 are that the initial adhesive strength is low, and by adding the metallocene polyolefin, it is difficult to uniformly apply the moisture-curable hot melt adhesive to a base material.

In addition, usually, when a moisture-curable hot melt adhesive is applied to a base material, a roll coater is often used. The moisture-curable hot melt adhesive is attached to the roll coater, and the base material flows through a coating line by the roll coater. However, the so-called "stringing" in which the base material pulls the moisture-curable hot melt adhesive in the form of a string from the roll coater may occur.

Thus, in recent years, a moisture-curable hot melt adhesive having an excellent balance including high initial adhesive strength, long open time, excellent coating property and reduced stringing property is desired, and development of the moisture-curable hot melt adhesive is an urgent need.

CITATION LIST

Patent Literature

Patent Literature 1: Japanese Patent No. 3022924
Patent Literature 2: Japanese Patent Laid-Open No. 2014-518916
Patent Literature 3: Japanese Patent Laid-Open No. 2004-10809

SUMMARY OF INVENTION

Technical Problem

The present invention is provided so as to solve the problem as described above. That is, an object of the present invention is to provide a moisture-curable hot melt adhesive having an excellent balance including high initial adhesive strength, long open time, excellent coating property and reduced stringing property, and a laminate on which the moisture-curable hot melt adhesive is applied.

Solution to Problem

The present invention and preferred embodiments of the present invention are as follows.

A moisture-curable hot melt adhesive comprising: (A) a urethane prepolymer having a terminal isocyanate group, (B) a metallocene-based polyolefin having a viscosity of 10,000 mPa·s or less at a temperature of 170° C., and (C) a polyester-polyether copolymer.

The moisture-curable hot melt adhesive according to the above embodiment, further comprising (D) an ethylene/carboxylic acid ester copolymer.

The moisture-curable hot melt adhesive according to any of the above embodiments, further comprising (E) an α-methyl styrene-based resin.

The moisture-curable hot melt adhesive according to any of the above embodiments, wherein the ethylene/carboxylic acid ester copolymer (D) comprises an ethylene/vinyl acetate copolymer.

The moisture-curable hot melt adhesive according to any of the above embodiments, wherein the content of vinyl acetate in the ethylene/vinyl acetate copolymer is 20 to 50% by weight.

The moisture-curable hot melt adhesive according to any of the above embodiments, wherein the melt flow rate of the ethylene/vinyl acetate copolymer (D) is 20 to 200 g/10 min.

The moisture-curable hot melt adhesive according to any of the above embodiments, comprising 2 to 15 parts by weight of the metallocene-based polyolefin (B) based on 100 parts by weight of a total weight of (A) to (E).

A laminate comprising the moisture-curable hot melt adhesive according to any of the above embodiments.

A method for producing a moisture-curable hot melt adhesive comprising a step of mixing: a polyol and an isocyanate compound for constituting (A) a urethane prepolymer having a terminal isocyanate group, (B) a metallocene-based polyolefin, (C) a polyester-polyether copolymer, (D) an ethylene/carboxylic acid ester copolymer, and (E) an α-methyl styrene-based resin.

Advantageous Effects of Invention

A hot melt adhesive of the present invention has high initial adhesive strength, long open time, excellent coating property and reduced stringing property, and therefore it can be applied to a variety of base materials and can contribute to an efficient product of a laminate.

DESCRIPTION OF EMBODIMENTS

First, a description about technical terms used herein will be given.

"Open time" refers to time from when an adherend is coated with a melted moisture-curable hot melt adhesive until when the fluidity of the adhesive is lost and the adhesive cannot wet the adherend surface.

"Initial adhesive strength" refers to adhesive strength when the temperature of a moisture-curable hot melt adhesive decreases and the adhesive solidifies after the adhesive is melted and applied to an adherend. The initial adhesive strength is influenced by wettability and cohesion. The high initial adhesive strength is preferable.

"Wettability" can be determined by bringing a heated and melted adhesive into contact with a base material (solid) and measuring an angle (α) made by an end of the melted moisture-curable hot melt adhesive and the contact face of the base material. As α becomes smaller, the wettability becomes higher and it is easy to adhere.

"Cohesion" refers to force due to interaction acting between molecules in a moisture-curable hot melt adhesive, occurring in a cooling process after the heated and melted adhesive is applied using an applicator.

Next, a description about a moisture-curable hot melt adhesive of the present invention will be given. The moisture-curable hot melt adhesive of the present invention comprises (A) a urethane prepolymer having a terminal isocyanate group, (B) a metallocene-based polyolefin having a viscosity of 10,000 mPa·s or less at a temperature of 170° C. and (C) a polyester-polyether copolymer. In the present specification, a moisture-curable hot melt adhesive is also referred to as "a hot melt adhesive" simply.

Each component comprised in the moisture-curable hot melt adhesive of the present invention will be described below.

<(A) Urethane Prepolymer Having a Terminal Isocyanate Group>

A moisture-curable hot melt adhesive of the present invention comprises (A) a urethane prepolymer having a terminal isocyanate group (also referred to as "component (A)"). As used herein, the urethane prepolymer having a terminal isocyanate group usually refers to those interpreted as a "urethane prepolymer", and it is not particularly limited as long as it has a terminal isocyanate group and the objective moisture-curable hot melt adhesive is obtainable. These urethane prepolymers can be obtained by reacting a polyol and an isocyanate compound according to a known method.

The "polyol" used herein is not limited as long as the objective urethane prepolymer is obtainable, and a known polyol for generally producing a polyurethane may be used. A polyol having 1 to 3 functional groups is preferable, in particular, a difunctional polyol, so-called diol is more preferable. The polyols may be used alone, or two or more polyols may be used in combination. Examples of the polyol include diols having a low molecular weight, such as ethylene glycol, 1-methyl ethylene glycol, 1-ethyl ethylene glycol, propylene glycol, and butanediol, pentanediol, hexanediol, heptanediol, octanediol, nonanediol, decanediol, neopentyl glycol, 2-methyl-1,3-propanediol, cyclohexanedimethanol and 2,4-dimethyl-1,5-pentanediol. At least one selected from ethylene glycol, butanediol, hexanediol, octanediol and decanediol is (are) preferred. These diols may be used singly or in combination.

Examples of the "polyol" in the present invention also include polyether polyols and polyester polyols.

Examples of the polyether polyol include polyoxytetramethylene glycol (PTMG), polyoxypropylene glycol (PPG), and polyoxyethylene glycol (PEG). As the polyether polyol, polyoxypropylene glycol is particularly preferable.

Examples of the polyester polyol in the present invention include an aromatic polyester polyol and an aliphatic polyester polyol.

The aromatic polyester polyol is preferably obtained by a reacting an aromatic carboxylic acid and a diol. Examples of the aromatic polycarboxylic acid include phthalic acid, isophthalic acid, terephthalic acid and hexahydroisophthalic acid. These may be used alone or in combination of two or more. Examples of the aromatic polyester polyol include polyalkylene phthalate, polyalkylene isophthalate and polyalkylene terephthalate which respectively have terminal OH groups. As the aromatic polyester polyol, polyalkylene phthalate having terminal OH groups is particularly preferable.

The aliphatic polyester polyol is preferably obtained by reacting an aliphatic carboxylic acid and a diol. Examples of the aliphatic carboxylic acids include adipic acid, sebacic acid, azelaic acid and decamethylene dicarboxylic acid. These may be used alone or in combination of two or more. Examples of the aliphatic polyester polyol include polyhexamethylene adipate (PHMA) and polybutylene adipate (PBA) which respectively have terminal OH groups. As the aliphatic polyester polyols, polyhexamethylene adipate having terminal OH groups is particularly preferable.

In the present invention, examples of a particularly preferred embodiment of polyols include polyoxytetramethylene glycol, polyoxypropylene polyol, polyalkylene phthalate having terminal OH groups and polyhexamethylene adipate having terminal OH groups. These may be used alone or in combination of two or more.

The number-average molecular weight of the polyol is not particularly limited but is preferably 1,000 to 4,000. Here, in the present specification, the weight-average molecular weight or number-average molecular weight is measured by gel permeation chromatography (GPC) using a calibration curve using monodisperse molecular weight polystyrene as a standard substance to convert molecular weight.

There is no particular limitation on the isocyanate compound in the present invention as long as the objective urethane prepolymer can be obtained, and the isocyanate compound which is used in conventional production of polyurethanes may be used. The isocyanate compound preferably has from 1 to 3 isocyanate groups per molecule on average, and is particularly preferably a difunctional isocyanate compound, so-called diisocyanate compound. The isocyanate compounds may be used alone, or two or more isocyanate compounds may be used in combination.

Examples of the "isocyanate compound" include ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylniethane diisocyanate, 2,2'-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, furfurylidene diisocyanate and 1-chlorobenzene-2,4-diisocyanate. These isocyanate compounds may be used alone or in combination.

In producing the "urethane prepolymer" according to the present invention, a monool and a monoisocyanate may be used, and also a trifunctional polyol and a trifunctional isocyanate may be used as long as the objective urethane prepolymer can be obtained. However, it is preferred to produce using at least a difunctional polyol (diol) and a difunctional isocyanate (diisocyanate). It is more preferred that the "urethane prepolymer" is produced by reacting a difunctional polyol with a difunctional isocyanate compound from the viewpoint of control of the thermal stability and a production method (and a production process thereof) of the obtainable moisture-curable hot melt adhesive.

In order to produce the urethane prepolymer having a terminal isocyanate group (A), a polyol and an isocyanate compound is mixed so that the lower limit of the molar ratio of NCO groups and OH groups (NCO/OH) is preferably 1.3 or more, more preferably 2 or more, and the upper limit thereof is preferably 3 or less. In addition, it is preferred to use about 2 mol (about from 1.8 mol to 2.3 mol) of difunctional isocyanate based on 1 mol of difunctional polyol because the objective urethane prepolymer can be produced comparatively easily.

<(B) Metallocene-Based Polyolefin Having a Viscosity of 10,000 mPa·s or Less at a Temperature of 170° C.>

In the present invention, the moisture-curable hot melt adhesive comprises (B) a metallocene-based polyolefin having a viscosity of 10,000 mPa·s or less at a temperature of 170° C. (also referred to as "component (B)" or simply referred to as a "metallocene-based polyolefin").

Herein, the "metallocene-based polyolefin" is defined as a polymer obtained by polymerizing olefins in the presence of a metallocene catalyst. The metallocene-based polyolefin comprises a chemical structure derived from a metallocene catalyst in the molecule. One aspect of the "chemical structure derived from metallocene catalyst" includes a metallocene catalyst itself represented by the following formula (I) or derivative(s) of the formula (I).

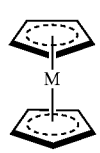

(I)

wherein in the formula (I), M represents a metal or a metal bonded to a halogen atom and the like.

A viscosity of the metallocene-based polyolefin (B) at a temperature of 170° C. is preferably 10,000 mPa·s or less, more preferably 1,000 to 10,000 mPa·s, and further preferably 2,000 to 8,000 mPa·s. The viscosity at a temperature of 170° C. of the metallocene-based polyolefin (B) is measured with a Brookfield RVT type viscometer (spindle No. 27). When the moisture-curable hot melt adhesive comprises the metallocene-based polyolefin having a viscosity of the above-mentioned range, a viscosity of the moisture-curable hot melt adhesive is reduced, stringing occurrence is reduced and the open time becomes longer.

By polymerizing olefins using the metallocene catalyst, the metallocene-based polyolefin having (i) a crystalline and (ii) a very narrow molecular weight distribution is synthesized.

The above (i) means that complete isotacticity and syndiotacticity can be arbitrarily controlled. Thus, in the obtained polymer, there is no unevenness in terms of crystallinity of the polymers, tacticity, content of methyl groups and the like, and therefore low crystalline sites causing adhesion reduction are less likely to generate.

As for the above (ii), a degree of molecular weight distribution of the metallocene-based polyolefin (B) represented by a polydispersity of (Mw/Mn) is preferably 1.0 to 3.5. The hot melt adhesive comprising the polyolefins having polydispersity of 1.0 to 3.5 is excellent in adhesive strength. The molecular weight distribution indicates the molecular weight distribution of a synthetic polymer, which is denoted by the ratio of the weight-average molecular weight (Mw) to number-average molecular weight (Mn) (i.e. polydispersity:Mw/Mn). In the present invention, measurement of the molecular weight distribution is performed by gel permeation chromatography (GPC).

In the present invention, the metallocene-based polyolefin may be a homopolymer or a copolymer.

Examples of the homopolymer include polyethylene and polypropylene.

In the present specification, the copolymer refers a copolymer of ethylene and other copolymerizable monomer(s) which can be copolymerized with ethylene. Examples of the copolymerizable monomer include α-olefins such as propylene, 1-octene, 1-butene; carboxylic acid (ester) having an ethylenic double bond such as vinyl acetate, (meth)acrylic acid, a (meth)acrylic acid ester, maleic acid and maleic acid ester; and carboxylic anhydrides having an ethylenic double bond such as maleic anhydride and phthalic anhydride. These copolymerizable monomers may be copolymerized with ethylene singly or in combination of two or more. That is, in the present invention, examples of the metallocene-based polyolefin (B) include homopolymer such as polyethylene and polypropylene, and ethylene copolymer such as ethylene/α-olefin copolymer, ethylene/a carboxylic acid having ethylenic double bond copolymer, ethylene/a carboxylic acid ester having ethylenic double bond copolymer, and ethylene/a carboxylic anhydride having ethylenic double bond copolymer. As used herein, the "(meth) acrylic acid" collectively means both of acrylic acid and methacrylic acid, and "(meth)acrylic acid ester" collectively means both of acrylic acid ester and methacrylic acid ester.

Examples of the ethylene/α-olefin copolymer include ethylene/propylene copolymer, ethylene/1-octene copolymer, ethylene/1-butene copolymer, and ethylene/propylene/1-butene copolymer.

In the present invention, as the metallocene-based polyolefin (B), a polymer based on polyethylene, polypropylene and the like are preferred, and ethylene/propylene copolymer is particularly preferred. In the moisture-curable hot melt adhesive of the present invention, when the metallocene-based polyolefin (B) is ethylene/propylene copolymer having a viscosity of 10,000 mPa·s or less at a temperature of 170° C., the moisture-curable hot melt adhesive particularly becomes excellent in long open time and coating property and reduced stringing property.

<(C) Polyester-Polyether Copolymer>
The moisture-curable hot melt adhesive comprises (C) a polyester-polyether copolymer (also referred to as "component (C)"). The use of the component (C) in the moisture-curable hot melt adhesive improves an initial adhesive strength.

The polyester-polyether copolymer (C) is preferably a thermoplastic elastomer having a hard segment and a soft segment. For example, preferred embodiments include polyester-polyether block copolymers having an aromatic polyester as a hard segment and an aliphatic polyether as a soft segment. Here, the hard segment is preferably a polyester obtained by polycondensation reaction of an aromatic dicarboxylic acid and an alkylene glycol. Specific examples of the polyesters include polyethylene terephthalate and polybutylene terephthalate, and polybutylene terephthalate is preferably comprised. Further, examples of a polyalkylene ether glycol used as the soft segment of the polyester-polyether block copolymer include polyethylene glycol, poly(1,2- and 1,3-propylene ether) glycol, polytetramethylene ether glycol, polyhexamethylene ether glycol, a block or random copolymer of ethylene oxide and propylene oxide, and a block or random copolymer of ethylene oxide and tetrahydrofuran. Among these, a block copolymer of polybutylene terephthalate and polytetramethylene glycol is particularly preferable.

When the polyester-polyether copolymer (C) is a copolymer having a chemical structure derived from polybutylene terephthalate, the moisture-curable hot melt adhesive of the present invention becomes excellent in initial adhesive strength.

In one embodiment of the polyester-polyether copolymer (C), a copolymer having a chemical structure derived from polybutylene terephthalate is preferred, and for example, a copolymer having chemical structures of the following formula (II) and formula (III) are particularly preferred.

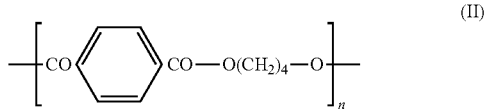
(II)

In the formula (II), n denotes an integer and is preferably 20 to 1,000.

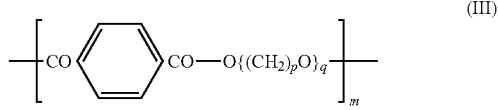
(III)

In the formula (III), each of p, q and m is an integer, it may be the same or different with each other. p is preferably an integer of 2 to 5, q is preferably an integer of 2 to 200, m is preferably an integer of 1 to 200.

Examples of the copolymer having the structures of formula (II) and formula (III) include Hytrel (registered trademark) manufactured by Toray-DuPont.

Although the melt viscosity (melt flow rate (MFR)) of the polyester-polyether copolymer (C) is not especially limited, about 2 to 20 g/10 min (190° C., 2.16 kg) is preferable.

As the polyester-polyether copolymer (C) used for the present invention, a commercially available product may be used. Examples of the commercially available product include "Hytrel" (registered trademark) manufactured by Toray-DuPont, "PELPRENE" (registered trademark) manufactured by Toyobo Co., Ltd., "Primalloy" (registered trademark) manufactured by Mitsubishi Chemical Corporation, and "Polyester" (registered trademark) by Nippon Synthetic Chemical Industry Co., Ltd. Specific examples may include Hytrel G3548L, 3046, 4057, 4047, 4767, 5557, 6347, 7247, 2571, 2751, 5557M, 6347M, 7247M, 4275BK, 7247R09, 7237F and the like (manufactured by Toray-DuPont), PELPRENE 40H, P40B, P30B, P40BU, P40U, P48U, P55U, P55B, P90BD, P80C, S1002, S2002, S3002, S6002, S9002 and the like (manufactured by Toyobo Co., Ltd.), Primalloy A1500N, A1600N, A1700N, A1800N, A1900N, A1606C, A1706C, A1602N, A1704N, A1610N, A1710N, B1902N, B1900N, B1903N, B1910N, B1920N, B1922N, B1932N, B1942N, B1600N, B1700N, B1800N, B1921N and the like (manufactured by Mitsubishi Chemical Corporation), Polyester SP-154, SP-160, SP-176, SP-165, SP-170, SP-185, WR-901, WR-905, WR-960, TP-220, TP-217, TP-290, TP-249, LP-033, LP-011, LP-035, LP-050, TP-235, TP-293, TP-219 (manufactured by Nippon Synthetic Chemical Industry Co., Ltd.).

<(D) Ethylene/Carboxylic Acid Ester Copolymer>
In the present invention, the moisture-curable hot melt adhesive preferably comprises an ethylene/carboxylic acid ester copolymer (D) (also referred to as "component (D)"). The use of component (D) in the moisture-curable hot melt adhesive improves adhesion to wood material and PET film. As used herein, the compounds falling under the component (B) shall not be embraced by the component (D).

The "ethylene/carboxylic acid ester copolymer (D)" in the present invention is not particularly limited as long as it does not interfere with the performance of the objective moisture-curable hot melt adhesive. The "ethylene/carboxylic acid ester copolymer (D)" is generally produced by polymerizing ethylene and a carboxylic acid ester.

Examples of the "carboxylic acid ester" which is a material for the component (D) include methyl (meth)acrylate, ethyl (meth)acrylate, n-propyl (meth)acrylate, n-butyl (meth)acrylate, sec-butyl (meth)acrylate, t-butyl (meth)acrylate, n-octyl (meth)acrylate, 2-ethylhexyl acrylate, (meth) acrylic acid and vinyl acetate. These carboxylic acid esters may be used alone or in combination.

Considering compatibility of each component constituting the moisture-curable hot melt adhesive of the present invention, initial adhesive strength, and the adhesion to wood material and PET film, the ethylene/carboxylic acid ester copolymer particularly preferably comprises ethylene/vinyl acetate copolymer.

The content of vinyl acetate in the ethylene/vinyl acetate copolymer is preferably 20% or more by weight, and more preferably 20 to 50% by weight. When the content of vinyl acetate in the ethylene/vinyl acetate copolymer is in the above range, the moisture-curable hot melt adhesive of the present invention becomes excellent in compatibility of the components (A) to (C) and excellent in initial adhesive property by improving initial cohesive force.

The melt flow rate (MFR) of the ethylene/vinyl acetate copolymer is preferably 20 g/10 min or more (190° C., 2.16 kg), more preferably 20 to 200 g/10 min (190° C., 2.16 kg), further preferably 30 to 100 g/10 min (190° C., 2.16 kg). When the melt flow rate of the ethylene-vinyl acetate copolymer is within the above range, initial adhesive strength and adhesion to wood or PET film are improved. In the present specification, the "melt flow rate" refers to an index showing fluidity of resin, which is calculated by heating/adding pressure to a certain amount of synthesized resin at a specific temperature (190° C.) in a cylindrical container heated with a heater and measuring the amount of resin pushed out per 10 minutes from an opening (nozzle) installed at the bottom of the container. A unit of g/10 min is used. For the test machine, an extrusion type plast meter specified by JIS K6769 is used. Measurements are taken using the measurement method specified by JIS K7210.

<(E) α-Methyl Styrene-Based Resin>

The moisture-curable hot melt adhesive of the present invention comprises (E) α-methyl styrene-based resin (also referred to as "component (E)"). As the α-methyl styrene-based resin (E), α-methyl styrene polymer or a styrene/α-methyl styrene copolymer may be used.

As the embodiment of the present invention, the α-methyl styrene-based resin (E) is preferably a styrene/α-methyl styrene copolymer, and in particular, preferably has a softening point of 75 to 150° C. (measured by the ring and ball method specified in JIS K2207). Specifically, examples of the commercially available products include Kristalex 3085 (trade name), Kristalex 3100 (trade name), Kristalex 1120 (trade name), and Kristalex 5140 (trade name) manufactured by Eastman Chemical Co.; and FTR-2120 (trade name) manufactured by Mitsui Chemicals, Inc.

By comprising the α-methyl styrene-based resin (E) in the moisture-curable hot melt adhesive of the present invention, initial adhesion does not decrease, stringing does not occur, and coating property becomes excellent, which result in excellent in a balance of the performances.

In the hot melt adhesive of the present invention, the content of the component (A) is preferably 20 to 50 parts by weight, more preferably 30 to 40 parts by weight, based on 100 parts by weight of the total weight of the components (A) to (E).

In the hot melt adhesive of the present invention, the content of the component (B) is preferably 2 to 15 parts by weight, more preferably 4 to 12 parts by weight, based on 100 parts by weight of the total weight of the components (A) to (E).

In the hot melt adhesive of the present invention, the content of the component (C) is preferably 2 to 20 parts by weight, more preferably 5 to 15 parts by weight, based on 100 parts by weight of the total weight of the components (A) to (E).

In the hot melt adhesive of the present invention, the content of the component (D) is preferably 0 to 20 parts by weight, more preferably 4 to 12 parts by weight, based on 100 parts by weight of the total weight of the components (A) to (E).

In the hot melt adhesive of the present invention, the content of the component (E) is preferably 0 to 60 parts by weight, more preferably 35 to 55 parts by weight, based on 100 parts by weight of the total weight of the components (A) to (E).

The hot melt adhesive of the present invention may further comprise a tackifier resin. The "tackifier resin" is not particularly limited as long as it is generally used in hot melt adhesives and provides the hot melt adhesive targeted by the present invention.

Examples of the tackifier resin may include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifier resins may be used alone or in combination. For the tackifier resin, liquid type tackifier resins can also be used as long as they are colorless to pale yellow in color tone, have substantially no odor, and have good thermal stability. Considering these properties comprehensively, hydrogenated derivatives of resins and the like are preferred as the tackifier resin.

As the tackifier resin, commercial products may be used. Examples of such commercial products include MARUKA-CLEAR H (trade name) manufactured by Maruzen Petrochemical Co., Ltd., Clearon K100 (trade name), Clearon K4090 (trade name) and Clearon K4100 (trade name) manufactured by YASUHARA CHEMICAL Co., ARKON M100 (trade name) manufactured by Arakawa Chemical Industries, Ltd., I-marv S110 (trade name) manufactured by Idemitsu Kosan Co., Ltd., T-REZ HA103 (trade name), T-REZ HA125 (trade name), T-REZ HC103 (trade name) manufactured by Tonen General Sekiyu K.K, Regalite R7100 (trade name) manufactured by Eastman Chemical Company. These commercial tackifier resins may be used singly or in combination.

The moisture-curable hot melt adhesive according of the present invention may contain other additives as necessary. The "additives" are not particularly limited, as long as they are usually used in a moisture-curable hot melt adhesive and the objective moisture-curable hot melt adhesive of the present invention can be obtained. Examples of such additives include a plasticizer, an antioxidant, a pigment, a photostabilizer, a flame retardant, a catalyst, a wax, and the like.

Examples of the "plasticizer" include dioctyl phthalate, dibutyl phthalate, dioctyl adipate, mineral spirit, and the like.

Examples of the "antioxidant" include a phenol-based antioxidant, a phosphite-based antioxidant, a thioether-based antioxidant, an amine-based antioxidant, and the like.

Examples of the "pigment" include titanium oxide, carbon black, and the like.

Examples of the "photostabilizer" include benzotriazole, hindered amine, benzoate, benzotriazole, and the like.

Examples of the "flame retardant" include a halogen-based flame retardant, a phosphorous-based flame retardant, an antimony-based flame retardant, a metal hydroxide-based flame retardant, and the like.

Examples of the "catalyst" include metal-based catalysts such as tin-based catalysts (trimethyltin laurate, trimethyltin hydroxide, dibutyltin dilaurate, and dibutyltin maleate, etc.), lead-based catalysts (lead oleate, lead naphthenate, and lead octoate, etc.), and other metal-based catalysts (naphthenic acid metal salts such as cobalt naphthenate) and amine-based catalysts such as triethylene-diamine, tetramethylethylenediamine, tetramethylhexylene-diamine, diazabicycloalkenes, dialkylaminoalkylamines, and the like.

Examples of the "wax" include waxes such as paraffin wax and microcrystalline wax.

In the method for producing the moisture-curable hot melt adhesive of the present invention, mixing order of each component, a mixing method and the like are not particularly limited, as long as the method comprises a step of mixing each component and additive(s) as necessary. One or both of a polyol and an isocyanate compound for obtaining the urethane prepolymer having a terminal isocyanate group (A) (component (A)) and the other components (B) and (C) may be mixed at the same time; or after producing a urethane prepolymer having a terminal isocyanate group by reacting a polyol and an isocyanate compound, the resultant may be mixed with the other components. For example, in the case where the hot melt adhesive comprising the urethane prepolymer having a terminal isocyanate group (A), the metallocene-based polyolefin (B), the polyester-polyether copolymer (C), the ethylene/carboxylic acid ester copolymer (D) and the α-methyl styrene-based resin (E) is produced, it is only necessary to mix the polyol, the isocyanate compound, the component (B), the component (C), the component (D) and component (E). In one embodiment, after mixing the polyol, component (B), component (C), component (D) and component (E), the mixture and the isocyanate compound may be mixed, Further, various additives such as a catalyst may be blended as necessary.

The hot melt adhesive of the present invention can be produced by heating, melting and mixing the components. For example, the above components are charged into melt-mixer equipped with a stirrer, and heated and mixed to produce the hot melt adhesive.

The moisture-curable hot melt adhesive of the present invention obtained in such way is a reactive hot melt adhesive, it is solid at a room temperature, and it may be used with the known method of the reactive hot melt adhesive. In general, the moisture-curable hot melt adhesive is used by heating and melting.

<Laminate>

A laminate of the present invention comprises the above moisture-curable hot melt adhesive. The laminate is produced by laminating "adherend" on the surface of a "base material". When producing the laminate, the moisture-curable hot melt adhesive may be applied to the base material side and/or the adherend side. Here, materials of the adherend and the base material and forms of those respectively may be the same or different.

The "base material" is not particularly limited but examples thereof are as follows: woody materials such as a plywood (for example, a lauan plywood), a medium density fiberboard (MDF), a particle board, a solid wood (or natural wood), and a woody fiber board; inorganic materials such as a cement board, a gypsum plaster board, and an autoclaved lightweight concrete (ALC); plastic materials such as polyethylene terephthalate, polycarbonate, polyurethane, polyethylene and polypropylene.

Although the form of the "base material" is not particularly limited, it may be molded resin-type, film-type, or sheet-type.

The "adherend" may be a usually used as an adherend, and examples thereof include, but are not limited to, a film, a sheet, and the like.

The film may be either colorless or colored, or either transparent or opaque, and examples thereof include films made of a polyolefin resin, a polyester resin, an acetate resin, a polystyrene resin, a vinyl chloride resin, and the like. Examples of the polyolefin resin include polyethylene and polypropylene, and examples of the polyester resin include polyethylene terephthalate.

The adherend may be a decorative sheet. Examples of the decorative sheet are as follows.

Sheets made of plastic materials such as a rigid or semi-rigid vinyl chloride resin, a polyolefin resin, and a polyester resin; boards obtained by slicing a wood into a sheet; and decorative papers subjected to various decorative printings.

A laminate of the present invention may be specifically employed in various fields such as building materials, furniture, electronic materials and automobiles.

It is not necessary to use a special apparatus so as to produce the laminate, and the laminate may be produced by using generally known production apparatuses including a conveyer, a coater, a press, a heater and a cutter.

For example, the laminate may be produced by the following procedure. While allowing the base material and the adherend to flow on a conveyer, the base material or adherend is coated with the moisture-curable hot melt adhesive according to the present invention using a coater. The coating temperature is controlled to a predetermined temperature by a heater. The adherend and the base material are laminated with each other through the moisture-curable hot melt adhesive by slightly pressing the adherend against the base material using a press. Then, the laminated adherend and base material are left standing to cool and allowed to flow by the conveyer as they are, thereby solidifying the moisture-curable hot melt adhesive. Then, the base material laminated with the adherend is cut into an appropriate size by a cutter.

These laminates can be produced efficiently and excellent in various qualities because the moisture-curable hot melt adhesive of the present invention has high initial adhesive strength, long open time, excellent coating property and reduced stringing property.

EXAMPLES

The present invention will be described below by using Examples and Comparative Examples. These Examples are merely for illustrative purposes and are not meant to be limiting on the present invention.

The components for producing the hot melt adhesive will be described below.

(A) Materials for Constituting a Urethane Prepolymer Having a Terminal Isocyanate Group <Polyol Component>

(A1) polytetramethylene ether glycol (PTMG2000 (trade name) manufactured by Mitsubishi Chemical Corporation, molecular weight: 2000, hydroxyl value: 53 to 59 (mgKOH/g))

(A2) polyester polyol (Dynacoll7380 (trade name) manufactured by Evonik, Inc., melting point: 70° C., hydroxyl value: 27 to 34 (mgKOH/g))

(A3) polyester polyol (HS 2H-350S (trade name) manufactured by Hokoku Corporation, melting point: 65° C., hydroxyl value: 27 to 34 (mgKOH/g))

(A4) polyester polyol (HS 2H-359T (trade name), manufactured by Hokoku Corporation, melting point: 110° C., hydroxyl value: 27 to 34 (mgKOH/g))

<Isocyanate Component>

(A5) 4,4'-diphenylmethane diisocyanate (Millionate MT (trade name) manufactured by Tosoh Corporation)

(B) Metallocene-Based Polyolefin Having a Viscosity of 10,000 mPa·s or Less at a Temperature of 170° C.

(B1) metallocene-based ethylene/propylene copolymer (Licocene PP2602 (trade name) manufactured by Clariant corporation, viscosity: 8000 mPa·s at 170° C.)

(B2) metallocene-based ethylene/propylene copolymer (Licocene PP1602 (trade name) manufactured by Clariant corporation, viscosity: 7000 mPa·s at 170° C.)

(B3) metallocene-based polyethylene (Licocene PE4201 (trade name) manufactured by Clariant corporation, viscosity: 60 mPa·s at 170° C.)

(B'4) metallocene-based ethylene copolymer (KERNEL KJ-640T (trade name) manufactured by Japan Polyethylene Corporation, viscosity: 400000 mPa·s at 170° C.)

(B'5) Non-metallocene-based polypropylene (HI-WAX NP105 (trade name) manufactured by Mitsui Chemicals, Inc., viscosity: 180 mPa·s at 170° C.)

Here, the viscosities of (B'4) and (B'5) are the values actually measured. These viscosities were measured by the same method for measuring the viscosity of the hot melt adhesive described later. The viscosities of the others are referred to the information disclosed by the manufacturers.

(C) Polyester-Polyether Copolymer (C1) polyester-polyether copolymer (Hytrel 3078 (trade name) manufactured by Toray-DuPont, MFR: 5 g/10 min (190° C., 2.16 kg))

(C2) polyester-polyether copolymer (Hytrel 3100 (trade name) manufactured by Toray-DuPont, MFR: 14 g/10 min (190° C., 2.16 kg))

(C3) polyester-polyether copolymer (Hytrel 4056 (trade name) manufactured by Toray-DuPont, MFR: 5.6 g/10 min (190° C., 2.16 kg))

(D) Ethylene/Carboxylic Acid Ester Copolymer (D1) ethylene-vinyl acetate copolymer (Ultrathene 760 (trade name) manufactured by Tosoh Corporation), VA content: 42%, MFR: 70 g/10 min (190° C., 2.16 kg))

(D2) ethylene-vinyl acetate copolymer (Evaflex EV45X (trade name) manufactured by Mitsui Dupont, VA content: 46%, MFR: 100 g/10 min(190° C., 2.16 kg))

(D3) ethylene-vinyl acetate copolymer (Ultrathene 720 (trade name) manufactured by Tosoh Corporation), VA content: 28%, MFR: 150 g/10 min (190° C., 2.16 kg))

(D4) ethylene-ethyl acrylate copolymer (NUC-6570 (trade name), manufactured by The Dow Chemical Company, EA content: 25%, MFR: 20 g/10 min (190° C., 2.16 kg))

(D5) ethylene-methyl methacrylate copolymer (ACRIFT CM5021 (trade name), MMA content: 28%, MFR: 450 g/10 min(190° C., 2.16 kg))

Here, the above abbreviations mean the following.

VA: vinyl acetate
EA: ethyl acrylate
MMA: methyl methacrylate
MFR: melt flow rate (E) α-Methyl Styrene-Based Resin (E1) α-methyl styrene (Kristalex3100 (trade name) manufactured by Eastman Chemical Co., softening point: 100° C.)

(E2) α-methyl styrene (Kristalex3085 (trade name) manufactured by Eastman Chemical Co., softening point: 85° C.)

(E3) α-methyl styrene (FTR2140 (trade name) manufactured by Mitsui Chemicals, Inc., softening point: 137° C.)

(E4) α-methyl styrene (Endex155 (trade name) manufactured by Eastman Chemical Co., softening point: 153° C.)

(F) Other Additives (F1) tackifier (C9 resin (Novares TN150 (trade name) manufactured by Rutgers Novares GmbH., softening point: 150° C.)

(F2) phenol-based antioxidant (AO-60 (trade name) manufactured by Adeka Co., Ltd.)

(F3) Fluorescent brightening agents (Tinopal OB (trade name) manufactured by BASF)

(F4) Titanium oxide (JR-405 (trade name) manufactured by Tayca Corporation)

<Production of Moisture-Curable Hot Melt Adhesives>

These components were mixed in composition shown in Table 1 and Table 2 to produce the moisture-curable hot-melt adhesives.

Example 1

The components (C1), (E1), (F2) and (F4) were melted and mixed at about 182° C. over about 1 hour using a universal stirrer to make a master batch. This master batch, (A1) and (A2) that were polyol components, (B1), (D1) and (F3) were added to a reaction container. The additives in the container were preheated at 150° C. for 1 hour and then stirred at the same temperature under reduced pressure for 1 hour. After it was confirmed that water was removed from the additives and they were sufficiently kneaded, (A5) was added, and the additives were stirred at the same temperature under reduced pressure for 1 hour. Then, 0.05 parts by weight of dimorpholinodiethyl ether (U-CAT 660M (trade name) manufactured by San-Apro Ltd.) as a catalyst was further added, and the additives were stirred under reduced pressure for 30 minutes to obtain a moisture-curable hot melt adhesive.

The amount of each component blended (added) is shown as in Table 1, a number in Table 1 is a converted value of solids, not including water, and the unit of a numerical value regarding a blended amount is "parts by weight." In addition, in the table, "NCO/OH" represents the molar ratio of NCO group to OH group in the component (A).

Examples 2 to 11 and Comparative Examples 1 to 4

Components were blended as shown in Table 1 or Table 2, and a moisture-curable hot melt adhesive was produced by the same method as Example 1.

For the moisture-curable hot melt adhesives of the Examples and the Comparative Examples, viscosity, creep (initial adhesiveness), open time, coating property and stringing property were evaluated by the following methods.

<Viscosity Measurement>

The viscosity of each moisture-curable hot melt adhesive was evaluated at 170° C. based on the B method, JAI7-1991. For the measurement, a Brookfield viscometer and a No. 27 rotor were used.

<Creep Measurement>

Coating with a hot melt adhesive was performed so that a 50±5 μm adhesive layer was formed between two PET films (50 μm), and then these laminated PET films were cut to a width of 25 mm and provided as a test piece. The ends of the test piece were peeled by hand, and the peeled portions were provided as tabs. The test piece was preliminarily heated in a thermostat bath at 40° C. for 1 minute, and then one tab of the test piece was fixed to the upper part of the thermostat bath, and a 245 g weight was hung on the other tab, and measurement was started. 5 minutes and 10 minutes after the start of the measurement, the creeping distance was measured. For the evaluation of initial adhesive strength before the reaction, a series of operations from the coating to the start of the measurement were performed within 5 minutes. In each of the Examples and the Comparative Examples, the peeling state of the laminated films during creep was the cohesive failure of the hot melt adhesive. The evaluation criteria are shown below.

<Evaluation of Creep (Creep at 10 Minutes after Start of Measurement)>
○○: The creeping distance was less than 0.5 cm.
○: The creeping distance was 0.5 cm or more and less than 1.0 cm.
Δ: The creeping distance was 1.0 cm or more and less than 1.5 cm.
x: The creeping distance was 1.5 cm or more.

<Evaluation of Open Time>
A particle board (10.0 cm×10.0 cm×1.5 cm) was placed in a thermostat and allowed to stand at 25° C. for 12 hours or more to make the temperature constant, and this particle board was provided as a test material. The particle board that was the test material was coated with each of the hot melt adhesives of the Examples and the Comparative Examples at 170° C., and adjusted by a roll coater so that the thickness was 70±10 μm. After the thickness of the adhesive layer was adjusted, a small piece of plywood (1.5 cm×5.0 cm) was attached to the particle board by finger pressure every 30 seconds. The open time was evaluated by whether the plywood adhered or not. The evaluation criteria are shown below.
○: The plywood adhered even 180 seconds or more after the coating.
Δ: The plywood adhered up to 120 seconds and 150 seconds after the coating, but the plywood did not adhere 180 seconds or more after the coating.
x: The plywood adhered only 90 seconds or less after the coating.

<Evaluation of Coating Property and Stringing Property>
A particle board (10.0 cm×10.0 cm×1.5 cm) was placed in a thermostat and allowed to stand at 25° C. for 12 hours or more to make the temperature constant, and this particle board was provided as a test material. The particle board as the test material was coated with each of the hot melt adhesives of the Examples and the Comparative Examples at 170° C., and adjusted by a roll coater so that the thickness was 70±10 μm. In this operation, the coating property and stringing property of the moisture-curable hot melt adhesive were visually evaluated. The evaluation criteria are shown below.

<Evaluation of Coating Property>
○: The particle board was uniformly coated.
Δ: The hot melt adhesive remained slightly at the rear in the coating direction and at the edges of the particle board.
x: The hot melt adhesive remained significantly at the rear in the coating direction and at the edges of the particle board.

<Evaluation of Stringing Property>
○: The stringing was not observed.
Δ: The stringing was slightly observed but it was easily broken.
x: The stringing was observed, and when the base material is picked up from the line, the stringing was still followed and not easily broken.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component (A) | (A1) | 11.91 | 11.91 | 11.91 | 11.91 | 11.91 | 11.91 | 11.91 | 11.91 | 11.91 | 11.91 | 11.91 |
| | (A2) | 17.16 | 8.58 | 17.16 | 17.16 | 17.16 | 8.58 | 17.16 | 17.16 | 17.16 | 17.16 | 17.16 |
| | (A3) | | 8.58 | | | | | | | | | |
| | (A4) | | | | | | 8.58 | | | | | |
| | (A5) | 5.79 | 5.79 | 5.79 | 5.79 | 5.79 | 5.79 | 5.79 | 5.79 | 5.79 | 5.79 | 5.79 |
| Component (B) | (B1) | 4.00 | 2.00 | 4.00 | | 10.00 | | 8.41 | 10.00 | 4.00 | 6.00 | 8.41 |
| | (B2) | | | | 4.00 | | | | | | | |
| | (B3) | | | | | | 4.00 | | | | | |
| Component (C) | (C1) | 9.12 | 9.12 | 9.12 | 9.12 | 9.12 | 9.12 | | | 9.12 | 9.12 | 9.12 |
| | (C2) | | | | | | | 9.12 | | | | |
| | (C3) | | | | | | | | 9.12 | | | |
| Component (D) | (D1) | 10.41 | | | 10.41 | 4.41 | 10.41 | 6.00 | | 6.00 | | 6.00 |
| | (D2) | | 8.41 | | | | | | | | | |
| | (D3) | | | 6.41 | | | | | | | | |
| | (D4) | | | | | | | | | | 4.41 | |
| | (D5) | | | | | | | | 4.41 | | | |
| Component (E) | (E1) | 41.44 | 45.44 | 45.44 | 41.44 | | 41.44 | 41.44 | 41.44 | 41.44 | 43.44 | |
| | (E2) | | | | | 33.15 | | | | | | |
| | (E3) | | | | | 8.29 | | | | | | |
| | (E4) | | | | | | | | | | 6.41 | |
| Component (F) | (F1) | | | | | | | | | | | 41.44 |
| | (F2) | 0.10 | 0.10 | 0.10 | 0.10 | 0.10 | 0.10 | 0.10 | 0.10 | 0.10 | 0.10 | 0.10 |
| | (F3) | 0.02 | 0.02 | 0.02 | 0.02 | 0.02 | 0.02 | 0.02 | 0.02 | 0.02 | 0.02 | 0.02 |
| | (F4) | 6.00 | 6.00 | 6.00 | 6.00 | 6.00 | 6.00 | 6.00 | 6.00 | 6.00 | 6.00 | 6.00 |
| | NCO/OH | 2.12 | 2.12 | 2.12 | 2.12 | 2.12 | 2.12 | 2.12 | 2.12 | 2.12 | 2.12 | 2.12 |
| | viscosity (mPa·s) | 12000 | 12000 | 8200 | 11500 | 10400 | 18600 | 10600 | 5200 | 13150 | 6300 | 13300 |
| creep (cm) | 5 min | 0.1 | 0.4 | 0.4 | 0.2 | 0.2 | 0.5 | 0.1 | 0.4 | 0.3 | 0.8 | 0.1 |
| | 10 min | 0.3 | 0.8 | 1.3 | 0.5 | 0.4 | 1.4 | 0.2 | 1.1 | 0.9 | 1.4 | 0.2 |
| | evaluation | ○○ | ○ | Δ | ○ | ○○ | Δ | ○○ | Δ | ○ | Δ | ○○ |
| open time | (sec.) | 180 | 210 | 150 | 180 | 180 | 180 | 240 | 120 | 240 | 120 | 120 |
| | evaluation | ○ | ○ | Δ | ○ | ○ | ○ | ○ | Δ | ○ | Δ | Δ |
| coating property | evaluation | ○ | ○ | ○ | ○ | ○ | Δ | ○ | ○ | Δ | ○ | Δ |

TABLE 1-continued

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| stringing property | evaluation | ○ | ○ | ○ | ○ | Δ | ○ | ○ | ○ | Δ | ○ | Δ |

TABLE 2

|  |  | Comparative Example | | | |
|---|---|---|---|---|---|
|  |  | 1 | 2 | 3 | 4 |
| Component (A) | (A1) | 11.91 | 11.91 | 11.91 | 11.91 |
|  | (A2) | 17.16 | 17.16 | 17.16 | 17.16 |
|  | (A5) | 5.79 | 5.79 | 5.79 | 5.79 |
| Component (B) | (B1) |  | 4.00 |  |  |
|  | (B'4) |  |  | 10.00 |  |
|  | (B'5) |  |  |  | 4.00 |
| Component (C) | (C1) | 9.12 |  | 9.12 | 9.12 |
| Component (D) | (D1) | 10.41 | 19.53 | 4.41 | 10.41 |
| Component (E) | (E1) | 45.44 | 41.44 | 41.44 | 41.44 |
| Component (F) | (F2) | 0.10 | 0.10 | 0.10 | 0.10 |
|  | (F3) | 0.02 | 0.02 | 0.02 | 0.02 |
|  | (F4) | 6.00 | 6.00 | 6.00 | 6.00 |
| NCO/OH |  | 2.12 | 2.12 | 2.12 | 2.12 |
| viscosity (mPa·s) |  | 7900 | 4800 | 11500 | 9000 |
| creep (cm) | 5 min | 0.3 | 1.2 | 0.2 | 0.8 |
|  | 10 min | 0.5 | 2.0 | 0.3 | 1.7 |
|  | evaluation | ○ | x | ○○ | x |
| open time | (sec.) | 60 | 120 | 60 | 90 |
|  | evaluation | x | Δ | x | x |
| coating property | evaluation | ○ | ○ | x | ○ |
| stringing property | evaluation | ○ | Δ | x | ○ |

As shown in Table 1, since the moisture-curable hot melt adhesives of the Examples contain components (A) to (C), an initial adhesive strength (creep), open time, coating property and stringing property are excellent with balance. On the other hand, as shown in Table 2, since the moisture-curable hot melt adhesives of the Comparative Examples do not contain component (B) or (C) embraced by the present invention, any of an initial adhesive strength (an initial cohesive), open time, coating property and stringing property are inferior to those of the moisture-curable hot melt adhesives of the Examples.

INDUSTRIAL APPLICABILITY

The present invention provides a moisture-curable hot melt adhesive. The moisture-curable hot melt adhesive according to the present invention can be used in exterior materials and interior materials for building materials, floorings, attaching and profile wrapping of a decorative sheet to a base material, and the like.

The invention claimed is:

1. A moisture-curable hot melt adhesive comprising, based on 100 parts by total weight of adhesive:
   (A) 20 to 50 parts by weight of a urethane prepolymer having a terminal isocyanate group, the urethane prepolymer being a reaction product of a mixture comprising a polyisocyanate, a polyether polyol and a polyester polyol,
   (B) 2 to 15 parts by weight of a metallocene-based polyolefin having a viscosity of 10,000 mPa·s or less at a temperature of 170° C., and
   (C) 2 to 20 parts by weight of a polyester-polyether block copolymer comprising a polybutylene terephthalate segment; and a segment selected from polytetramethylene glycol, and
   (D) 4 to 12 parts by weight of an ethylene/carboxylic acid ester copolymer comprising an ethylene vinyl acetate copolymer.

2. The moisture-curable hot melt adhesive according to the above claim 1, wherein the content of vinyl acetate in the ethylene/vinyl acetate copolymer is 20 to 50% by weight.

3. The moisture-curable hot melt adhesive according to the above claim 1, wherein the melt flow rate of the ethylene/vinyl acetate copolymer (D) is 20 to 200 g/10 min at 190° C., 2.16 kg.

4. The moisture-curable hot melt adhesive according to claim 1, further comprising (E) an α-methyl styrene-based resin.

5. The moisture-curable hot melt adhesive according to claim 4, comprising 2 to 15 parts by weight of the metallocene-based polyolefin (B) based on 100 parts by weight of a total weight of (A), (B), (C) and (E).

6. A laminate comprising the moisture-curable hot melt adhesive according to claim 1.

7. Cured reaction products of the moisture-curable hot melt adhesive according to claim 1.

8. A method for producing a moisture-curable hot melt adhesive according to claim 1 comprising:
   reacting a polyol and an isocyanate compound to form (A) a urethane prepolymer having a terminal isocyanate group;
   providing (B) a metallocene-based polyolefin, (C) a polyester-polyether copolymer, (D) an ethylene/carboxylic acid ester copolymer, and (E) an α-methyl styrene-based resin; and
   mixing the (A) a urethane prepolymer, (B) the metallocene-based polyolefin, (C) the polyester-polyether copolymer, (D) the ethylene/carboxylic acid ester copolymer, and (E) the α-methyl styrene-based resin to form the moisture-curable hot melt adhesive.

9. The moisture-curable hot melt adhesive according to claim 1, wherein the ethylene/carboxylic acid ester copolymer (D) comprises an ethylene-$C_{1-10}$ alkyl (meth)acrylate copolymer.

10. The moisture-curable hot melt adhesive according to claim 1, wherein the ethylene/carboxylic acid ester copolymer (D) comprises the ethylene/vinyl acetate copolymer and an ethylene-$C_{1-10}$ alkyl (meth)acrylate copolymer.

11. The moisture-curable hot melt adhesive according to claim 1, comprising:
   30 to 40 parts by weight of the (A) urethane prepolymer;
   4 to 12 parts by weight of the (B) metallocene-based polyolefin;
   5 to 15 parts by weight of the (C) polyester-polyether copolymer;
   wherein the total weight of all components in the moisture curable hot melt adhesive is 100.

12. A moisture-curable hot melt adhesive comprising, based on 100 parts by total weight of adhesive:
   (A) 20 to 50 parts by weight of a urethane prepolymer having a terminal isocyanate group, the urethane prepolymer being a reaction product of a mixture comprising a polyisocyanate, a polyether polyol and a polyester polyol, (B) 2 to 15 parts by weight of a metallocene-based polyolefin having a viscosity of 10,000 mPa·s or less at a temperature of 170° C., and (C) to 20 parts by weight of a polyester-polyether copolymer having a chemical structure comprising

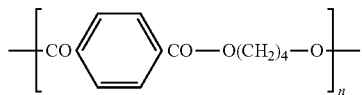
(II)

wherein n denotes an integer and is preferably 20 to 1,000; and

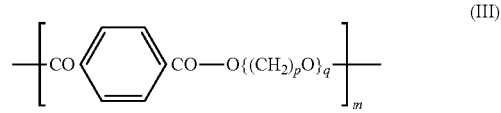
(III)

wherein p is an integer of 2 to 5, q is an integer of 2 to 200, and m is an integer of 1 to 200, and (D) 4 to 12 parts by weight of an ethylene/carboxylic acid ester copolymer.

13. The moisture-curable hot melt adhesive according to claim 1, wherein the urethane prepolymer mixture comprises an amount of the polyether polyol and a greater amount of polyester polyol, the amounts in parts by weight of the mixture.

* * * * *

UNITED STATES PATENT AND TRADEMARK OFFICE
CERTIFICATE OF CORRECTION

PATENT NO. : 11,236,257 B2
APPLICATION NO. : 16/013198
DATED : February 1, 2022
INVENTOR(S) : Kenji Matsuda, Ai Takamori and Tsuyoshi Tamogami It is certified that error appears in the above-identified patent and that said Letters Patent is hereby corrected as shown below:

In the Specification

Column 5, Line 11 change "4,4'-diphenylniethane diisocyanate" to --4,4'-diphenylmethane diisocyanate--.

In the Claims

Column 19, Line 7 change "(C) to 20 parts" to --(C) 2 to 20 parts--.

Signed and Sealed this
Twenty-seventh Day of December, 2022

*Katherine Kelly Vidal*

Katherine Kelly Vidal
*Director of the United States Patent and Trademark Office*